(12) United States Patent
Crosland

(10) Patent No.: US 7,062,589 B1
(45) Date of Patent: Jun. 13, 2006

(54) BUS COMMUNICATION APPARATUS FOR PROGRAMMABLE LOGIC DEVICES AND ASSOCIATED METHODS

(75) Inventor: Andrew Crosland, Bucks (GB)

(73) Assignee: Altera Corporation, San Jose, CA (US)

( * ) Notice: Subject to any disclaimer, the term of this patent is extended or adjusted under 35 U.S.C. 154(b) by 231 days.

(21) Appl. No.: 10/465,124

(22) Filed: Jun. 19, 2003

(51) Int. Cl.
*G06F 13/00* (2006.01)
*G06F 13/38* (2006.01)

(52) U.S. Cl. ............... 710/306; 710/310; 710/315; 712/37

(58) Field of Classification Search ............ 710/38, 710/100, 300, 105, 306, 311, 312, 315, 316, 710/310, 52; 709/227, 253, 208; 712/36–38; 370/260, 237, 395.43; 711/103; 716/1, 716/17; 326/39; 713/501; 700/3
See application file for complete search history.

(56) References Cited

U.S. PATENT DOCUMENTS 5,535,342 A * 7/1996 Taylor ................... 710/315
6,286,074 B1 * 9/2001 Batchelor et al. ........... 710/305
6,311,255 B1 * 10/2001 Sadana .................. 711/152
6,636,487 B1 * 10/2003 Roy ....................... 370/260
6,745,369 B1 * 6/2004 May et al. ................. 716/1
6,904,375 B1 * 6/2005 Sabih et al. .............. 702/75
2002/0019924 A1 * 2/2002 Davies et al. .............. 712/1
2004/0205371 A1 * 10/2004 Huang .................... 713/600
2004/0236893 A1 * 11/2004 May et al. ............... 710/306

OTHER PUBLICATIONS

"FPGA-based modular design for five-level inverter control with optimized pulse patterns" by Hasenkopf et al. (summary only) Publication Date: May 26-29, 2002.*

* cited by examiner

*Primary Examiner*—Gopal C. Ray
(74) *Attorney, Agent, or Firm*—Law Offices of Maximilian R. Peterson

(57) ABSTRACT

A programmable logic device (PLD) includes programmable logic circuitry and a bridge circuitry. The bridge circuitry includes a first interface circuitry and a first signal select circuitry. The first signal select circuitry couples to the first interface circuitry and the programmable logic circuitry. The bridge circuitry further includes an information interchange circuitry. The first signal select circuitry is configured to selectably provide a communication path between the information interchange circuitry and either the programmable logic circuitry or the first interface circuitry.

25 Claims, 7 Drawing Sheets

BUS COMMUNICATION APPARATUS FOR PROGRAMMABLE LOGIC DEVICES AND ASSOCIATED METHODS

TECHNICAL FIELD

This patent application relates generally to logic circuitry and programmable logic devices (PLDs) and, more particularly, to apparatus and methods for bus communications in PLDs.

BACKGROUND

Because of their inherent flexibility and the ability to readily re-configure PLDs, PLDs have increasingly proliferated in many areas of technology, such as data processing and signal processing applications. PLDs may include not only the conventional PLD fabric (programmable logic), but also relatively sophisticated blocks of circuitry, or intellectual property (IP).

The addition of the IP blocks increases the utility and power of PLDs. Nevertheless, IP blocks, such as processors, often use particular communication methodology, such as a particular bus communication protocol. Although a particular bus may facilitate communication with a given IP block, it may also hinder data throughput in the PLD. Put another way, the PLD's adherence to the bus communication protocol, while providing for communication with the IP block(s), may nevertheless adversely impact the data throughput and, hence, the overall performance, of the PLD. A need therefore exists for accommodating desired buses and their respective communication protocols without necessarily hindering the performance of the PLD.

SUMMARY

This invention relates to providing flexible communications in integrated circuits, such as PLDs. One aspect of the invention concerns apparatus for providing communications in PLDs. In one embodiment, a PLD includes programmable logic circuitry and a bridge circuitry. The bridge circuitry includes an interface circuitry and a signal select circuitry. The signal select circuitry couples to the first interface circuitry and the programmable logic circuitry. The bridge circuitry further includes an information interchange circuitry. The signal select circuitry is configured to provide in a selectable manner a communication path between the information interchange circuitry and either the programmable logic circuitry or the interface circuitry.

In another embodiment, a PLD includes a bridge circuitry. The bridge circuitry includes a signal select circuitry, an interface circuitry, and an information interchange circuitry. The information interchange circuitry couples to the signal select circuitry. The interface circuitry communicates with the signal select circuitry via a first signal set that includes at least one signal. The signal select circuitry couples, in a selectable manner, either the first signal set or a second signal set (which includes at least one signal) to the information interchange circuitry.

Another aspect of the invention concerns methods of communicating signals in PLDs. One embodiment according to the invention constitutes a method of communicating information to an information interchange circuitry in a programmable logic device (PLD) that includes programmable logic circuitry and a bridge circuitry. The method includes providing, in a selectable manner, a communication path between the information interchange circuitry and either the programmable logic circuitry or an interface circuitry within the bridge circuitry.

Another embodiment according to the invention constitutes a method of communicating information to an information interchange circuitry in a bridge circuitry within a programmable logic device (PLD). The bridge circuitry includes an interface circuitry configured to communicate information via a first signal set that includes at least one signal. The method includes coupling, in a selectable manner, either the first signal set or a second signal set (which includes at least one signal) to the information interchange circuitry.

DESCRIPTION OF THE DRAWINGS

The appended drawings illustrate only exemplary embodiments of the invention and therefore should not be considered as limiting its scope. The disclosed inventive concepts lend themselves to other equally effective embodiments. In the drawings, the same numeral designators used in more than one drawing denote the same, similar, or equivalent functionality, components, or blocks.

DETAILED DESCRIPTION

This invention contemplates communication and interface circuitry and associated methods that provide flexible communication with desired buses and PLD circuitry. By using circuitry according to the invention, the user may communicate with and through a particular desired bus protocol. Alternatively, the user may selectively bypass the bus protocol and associated interface circuitry, as desired, in order to increase the flexibility and throughput of communication with other circuitry within the PLD.

Unlike conventional approaches, the communication and interface circuitry according to the invention allows the user to choose whether to communicate via desired bus protocols. Some bus protocols have limitations that may decrease the information transfer rate. For example, the AMBA high-speed bus (AHB) protocol, well known to persons of ordinary skill in the art, allows a read operation or a write operation per clock cycle. That limitation may decrease the throughput and efficiency of the PLD and the overall system.

By using the inventive concepts, the user may avoid the speed and efficiency penalty associated with such bus protocols. Put another way, the user may selectively bypass the bus protocol and associated interface circuitry and communicate the information directly to desired parts of the PLD, such as a bridge. Accordingly, the user may increase the data throughput of the PLD and of the overall system that includes the PLD.

Figure 1:
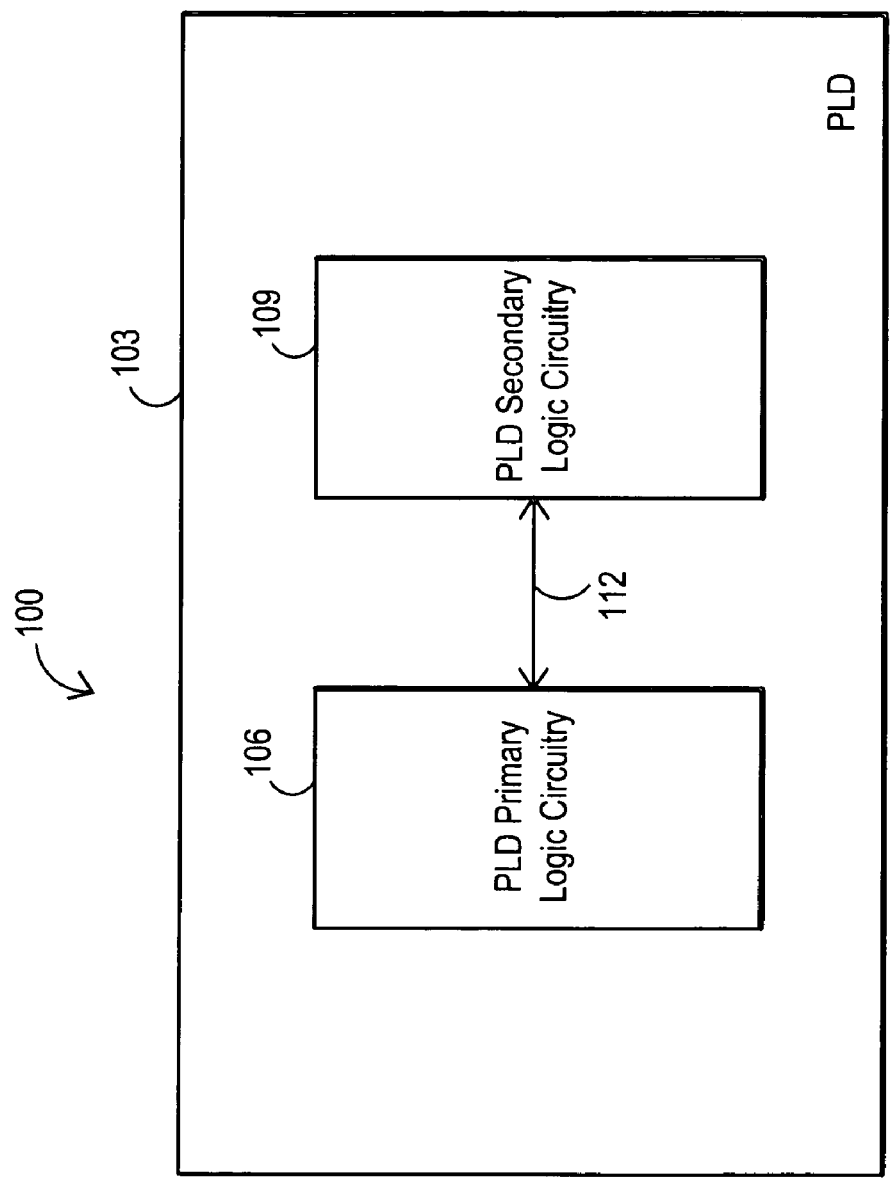
FIG. 1 shows a circuit arrangement according to the invention that includes a PLD with PLD primary logic circuitry and PLD secondary logic circuitry.

FIG. 1 shows a circuit arrangement 100 according to the invention. Circuit arrangement 100 includes PLD 103, which includes PLD primary logic circuitry and PLD secondary logic circuitry. PLD primary logic circuitry includes programmable logic (not shown explicitly) and programmable interconnect (not shown explicitly).

PLD primary logic circuitry 106 may include blocks of configurable or programmable logic, such as look-up tables (LUTs), product-term logic, multiplexers, logic gates, registers, memory, and the like, as persons skilled in the art with the benefit of the description of the invention understand.

The programmable interconnect couples to the programmable logic and allows the establishment of configurable interconnects (coupling mechanisms) between various blocks and circuitry within the programmable logic. By configuring or programming the programmable logic and the programmable interconnect, the user may configure the functionality of PLD primary logic circuitry 106. Typically, PLD 103 receives configuration data from an external source, such as a memory. PLD 103 uses the configuration data to establish desired logic and interconnect functionality (specified by the user via the configuration data), as persons skilled in the art with the benefit of the description of the invention understand.

PLD secondary logic circuitry 109 may include a wide variety of configurable logic circuitry, as persons of ordinary skill in the art who have the benefit of the description of the invention understand. By way of illustration, PLD secondary logic circuitry 109 may include one or more processors, blocks of specialized logic (e.g., digital signal processors), microcontrollers, microprocessors, general-purpose logic, communication circuitry (e.g., network interface controller), IP blocks, and the like. Alternatively, or in addition, PLD secondary logic circuitry 109 may include other logic circuitry or blocks of logic circuitry, as persons of ordinary skill in the art who have the benefit of the description of the invention understand.

PLD primary logic circuitry 106 may communicate with PLD secondary logic circuitry 109 via signal link 112. Signal link 112 may constitute circuitry (e.g., interface circuitry) to facilitate communication of a plurality of signals (e.g., data, control, and status signals) between PLD primary logic circuitry 106 and PLD secondary logic circuitry 109. Generally, the nature and function of those signals depend on the communication interfaces and protocols for desired PLD primary logic circuitry 106 and PLD secondary logic circuitry 109, as persons skilled in the art with the benefit of the description of the invention understand.

PLD primary logic circuitry 106 and PLD secondary logic circuitry 109 may reside in different clock domains. If PLD primary logic circuitry 106 and PLD secondary logic circuitry 109 operate synchronously with respect to each other, link 112 may constitute a number of signal lines or conductors. On the other hand, if PLD primary logic circuitry 106 and PLD secondary logic circuitry 109 operate asynchronously with respect to each other, one may use a bridge to interface PLD primary logic circuitry 106 and PLD secondary logic circuitry 109.

Figure 2:
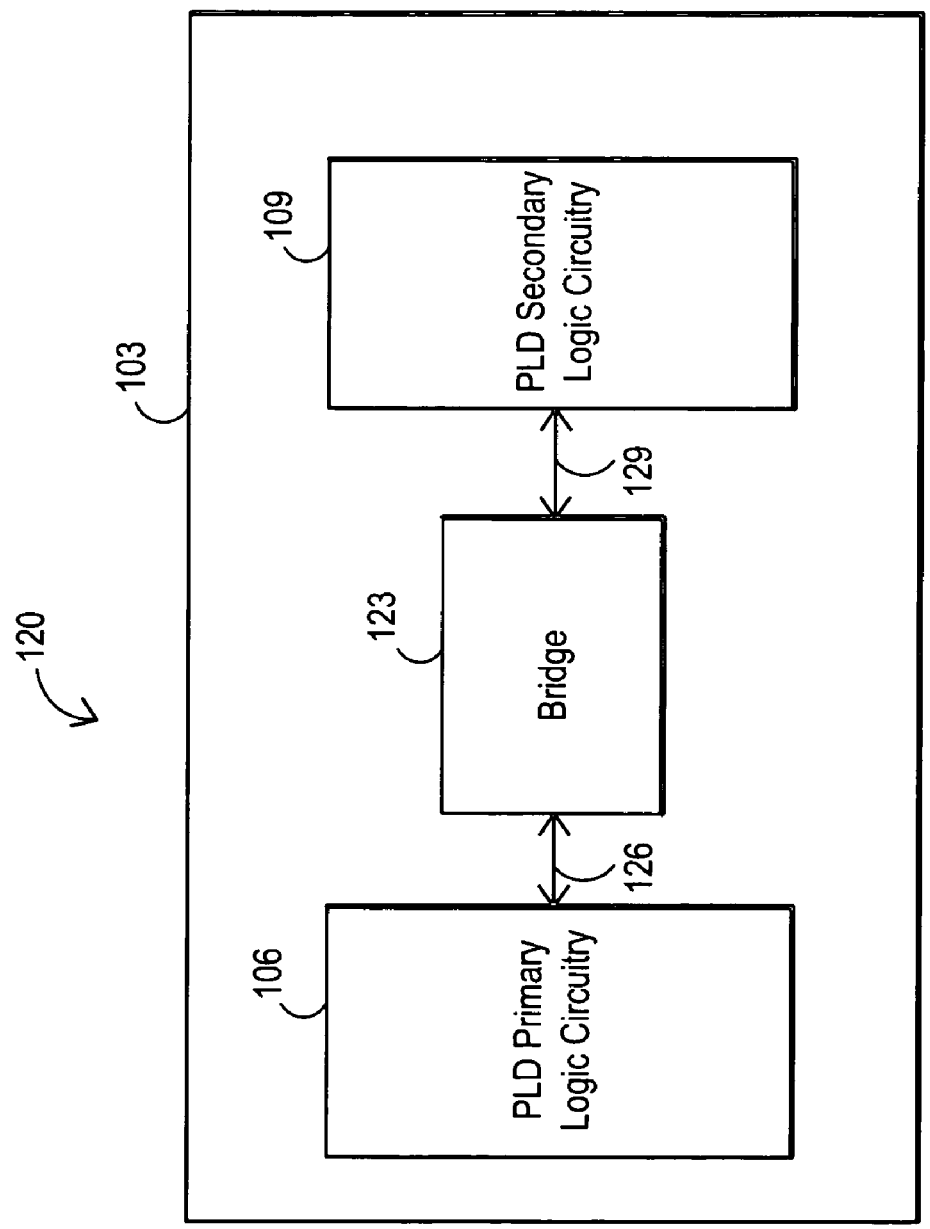
FIG. 2 illustrates a circuit arrangement according to the invention that includes an interface bridge.

FIG. 2 illustrates a circuit arrangement 120 according to the invention that includes an interface bridge. More specifically, bridge 123 couples to PLD primary logic circuitry 106 via signal link 126. Bridge 123 also couples to PLD secondary logic circuitry 109 via signal link 129. Through signal link 126, bridge 123 may communicate information, such as data, control, and status signals with PLD primary logic circuitry 106.

Similarly, by using signal link 129, bridge 123 may communicate information, such as data, control, and status signals with PLD secondary logic circuitry 109. Signal link 126 and signal link 129 may include a plurality of signal lines or conductors. The number, configuration, and functionality of those signal lines depends on factors such as design and performance specifications for PLD 103 generally, and for PLD primary logic circuitry 106 and PLD secondary logic circuitry 109. Those factors fall within the knowledge of persons of ordinary skill in the art who have the benefit of the description of the invention.

Figure 3:
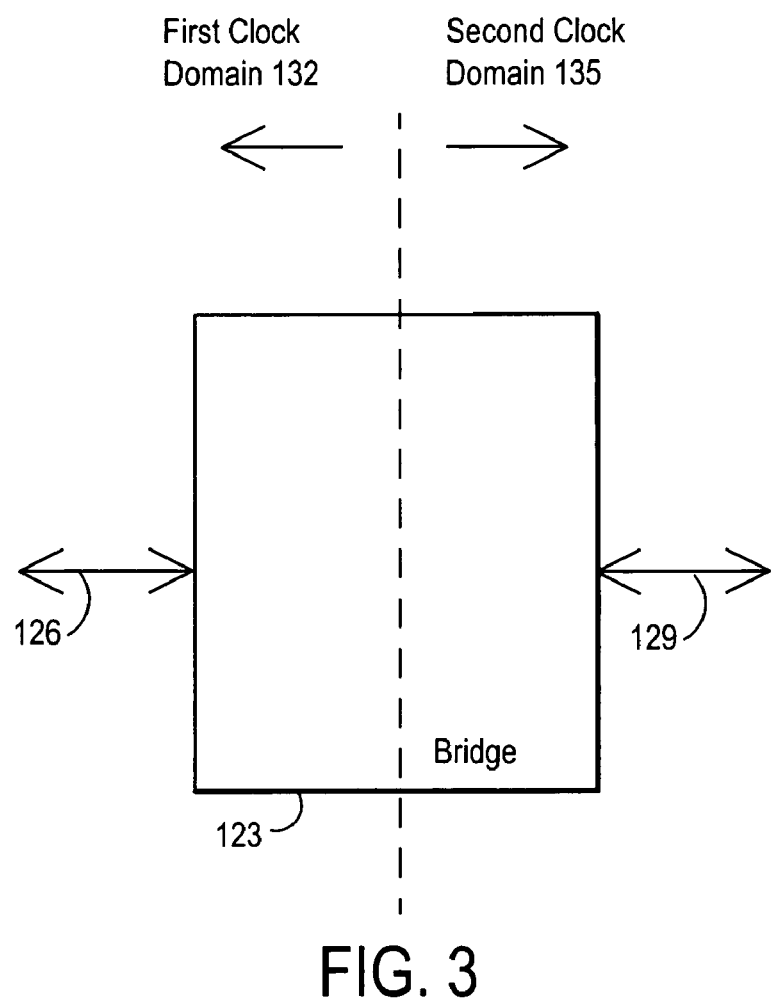
FIG. 3 depicts a conceptual representation of a bridge according to the invention.

FIG. 3 depicts a conceptual representation of bridge 123 as the interface mechanism between the clocks domains for PLD primary logic circuitry 106 (not shown explicitly) and PLD secondary logic circuitry 109 (not shown explicitly). As noted above, PLD primary logic circuitry 106 and PLD secondary logic circuitry 109 may operate in different clock domains. Referring to FIG. 3, PLD primary logic circuitry 106 operates in a first clock domain 132, whereas PLD secondary logic circuitry 109 operates in a second clock domain 135.

First clock domain 132 and second clock domain 135 may correspond to the same clock frequency (i.e., the frequency of a clock in first clock domain 132 is the same as the frequency of a clock in second clock domain 135). Generally, first clock domain 132 and second clock domain 135 correspond to different clock frequencies (i.e., the frequency of a clock in first clock domain 132 differs from the frequency of a clock in second clock domain 135).

Bridge 123 facilitates information (e.g., data, control, and status signals) exchange between the two clock domains. In other words, bridge 123 provides a mechanism for information between PLD primary logic circuitry 106 (operating in first clock domain 132) and PLD secondary logic circuitry 109 (operating in second clock domain 135). PLD primary logic circuitry 106 communicates and exchanges information with bridge 123 via signal link 126. Similarly, PLD secondary logic circuitry 109 communicates and exchanges information with bridge 123 through signal link 129.

Figure 4:
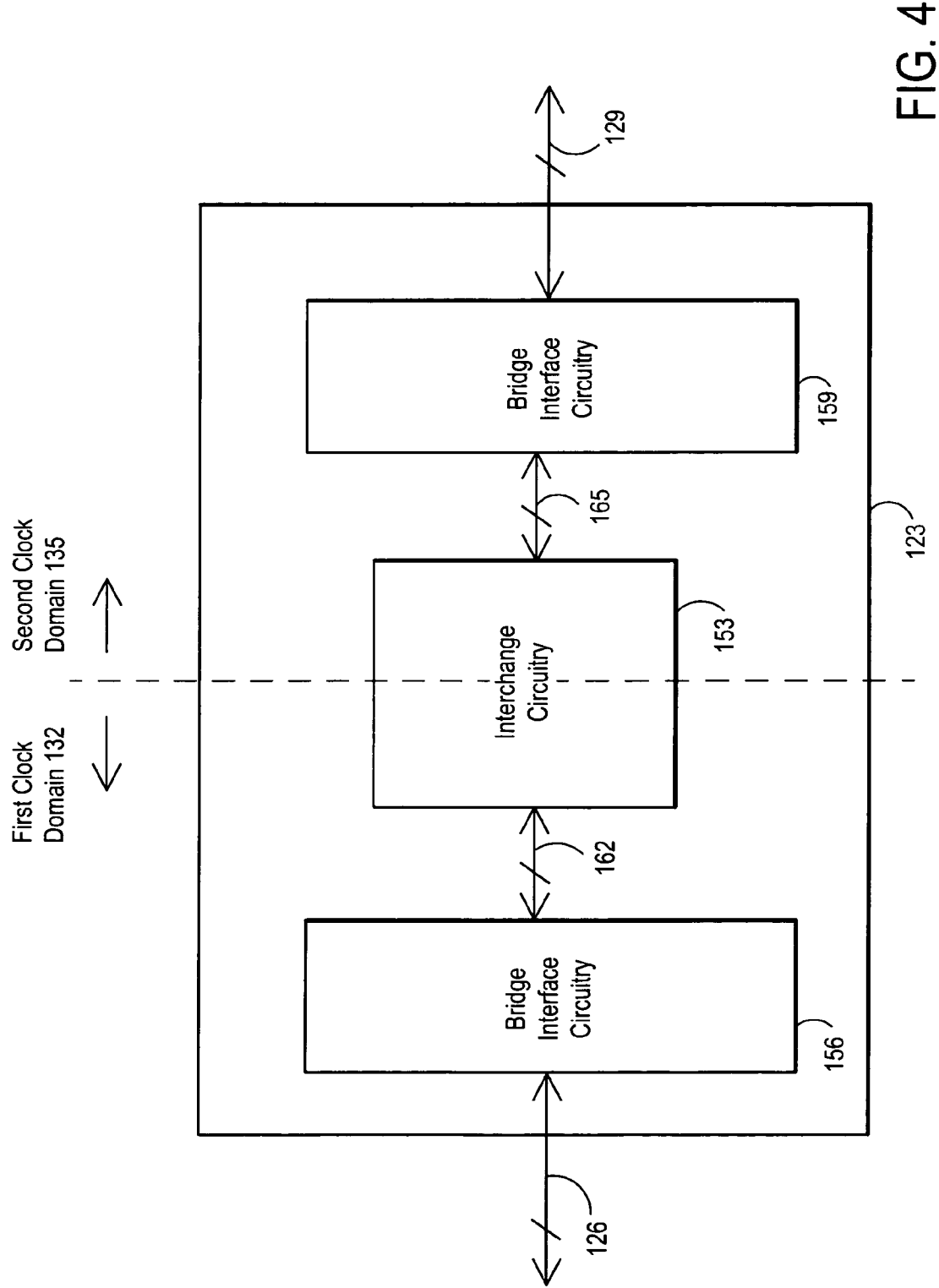
FIG. 4 shows a more detailed conceptual block diagram of a bridge according to the invention.

FIG. 4 shows a more detailed conceptual block diagram of bridge 123 as the interface mechanism between the clocks domains for PLD primary logic circuitry 106 (not shown explicitly) and PLD secondary logic circuitry 109 (not shown explicitly). Bridge 123 includes bridge interface circuitry 156, information interchange circuitry 153, and bridge interface circuitry 159.

Bridge interface circuitry 156 communicates with PLD primary logic circuitry 106 (not shown explicitly) via signal link 126. Likewise, bridge interface circuitry 156 communicates with PLD primary logic circuitry 106 (not shown explicitly) via signal link 126. Signal link 126 and signal link 129 may constitute the signal lines described above, as desired.

Through signal link 162, bridge interface circuitry 156 communicates with information interchange circuitry 153. Signal link 162 facilitates communication of information, such as data, control, and status signals, between information interchange circuitry 153 and bridge interface circuitry 156. Likewise, through signal link 165, bridge interface circuitry 159 communicates with information interchange circuitry 153. Signal link 165 provides a mechanism that allows communication of information, such as data, control, and status signals, between information interchange circuitry 153 and bridge interface circuitry 159.

Information interchange circuitry 153 constitutes a mechanism for interchange and exchange of information between first clock domain 132 (corresponding to PLD primary logic circuitry 106) and second clock domain 135 (which corresponds to PLD secondary logic circuitry 109). Information interchange circuitry 153 may communicate any desired information between first clock domain 132 and second clock domain 135, such as data, status, and control information.

Interchange circuitry 153 may include storage capability, as desired. By way of illustration, in illustrative embodiments according to the invention, information interchange circuitry 153 may constitute one or more memory circuits or buffers, such as first-in, first-out (FIFO) buffers or circuits, as desired. By providing storage capability within information interchange circuitry 153, one may provide a general asynchronous interfacing mechanism between first clock domain 132 and second clock domain 135.

Bridge interface circuitry 156 (and, hence, PLD primary logic circuitry 106) and bridge interface circuitry 159 (and therefore PLD secondary logic circuitry 109) may assume various roles in the PLD in which they reside. More specifically, bridge interface circuitry 156 may constitute a master interface circuitry, whereas bridge interface circuitry 159 may constitute a slave interface circuitry, as desired. Conversely, bridge interface circuitry 156 may be a slave interface circuitry, whereas bridge interface circuitry 159 may serve as a master interface circuitry, as desired. In other words, bridge 123 provides a flexible mechanism for communication and exchange of information between PLD primary logic circuitry 106 and PLD secondary logic circuitry 109.

Figure 5:
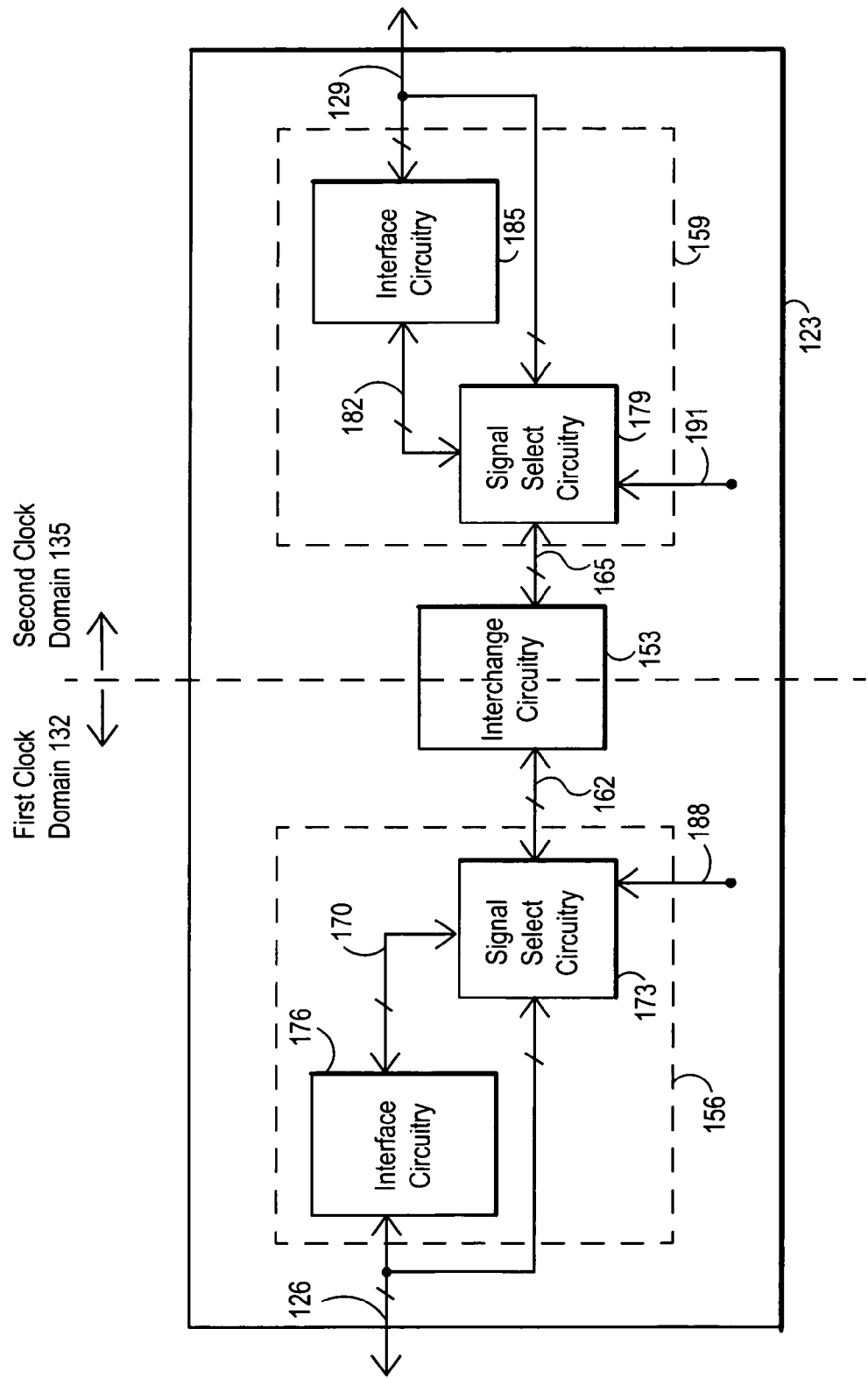
FIG. 5 illustrates a more detailed conceptual block diagram of an exemplary embodiment of a bridge according to the invention.

FIG. 5 illustrates a more detailed conceptual block diagram of an exemplary embodiment of bridge 123 according to the invention. Similar to the embodiment in FIG. 4, bridge 123 includes bridge interface circuitry 156, information interchange circuitry 153, and bridge interface circuitry 159.

Bridge interface circuitry 156 includes interface circuitry 176 and signal select circuitry 173. Interface circuitry 176 allows bridge 123 to recognize, and communicate using, a desired bus protocol. In other words, by using signal link 126 and interface circuitry 176, bridge 123 and PLD primary logic circuitry 106 (not shown explicitly) can communicate using a desired bus communication protocol.

Through signal link 126, interface circuitry 176 may communicate data, status, and control signals (for example, signals, for read and write operations) with PLD primary logic circuitry 106. More specifically, signal link 126 and interface circuitry 176 allow PLD primary logic circuitry 106 to communicate with bridge 123 using a desired bus communication protocol by communicating signals with prescribed or desired timing and sequence. For example, signal link 126 and interface circuitry 176 may communicate appropriate signals for a read operation or a write operation.

Interface circuitry 176 communicates with signal select circuitry 173 via signal link 170. More specifically, signal link 170 provides a mechanism for communicating data, status, and control signals (for example, signals for read and write operations) between interface circuitry 176 and signal select circuitry 173. Signal select circuitry 173 may selectively (based on select signals, as described below in detail) communicate signals between interface circuitry 176 and information interchange circuitry 153. Thus, the user may selectively change or switch the communication mode of bridge 123 (based on select signal 188 and select signal 191, as described below in detail).

The user may change or switch the communication mode at the configuration stage of PLD 103, or later during operation of PLD 103, as desired. The inventive concepts therefore provide a mechanism for dynamic switching or changing of the communication mode depending on the user's needs or choices.

Signal select circuitry 173 may also communicate with PLD primary logic circuitry 106 via signal link 126. Through signal link 126, PLD primary logic circuitry 106 may communicate data, control, and status signals (for example, signals for read and write operations) with signal select circuitry 173. Signal select circuitry 173 may selectively (based on select signal 188, as described below in detail) communicate signals between PLD primary logic circuitry 106 and information interchange circuitry 153.

Select signal 188 determines whether signal select circuitry 173 allows PLD primary logic circuitry 106 to communicate with information interchange circuitry 153 directly or through interface circuitry 176. In other words, one state (e.g., a logic low state) of select signal 188 causes signal select circuitry 173 to provide a communication path or mechanism between PLD primary logic circuitry 106 and information interchange circuitry 153 through signal link 126, interface circuitry 176, signal link 170, and signal link 162. In this state, by using signal link 126 and interface circuitry 176, bridge 123 and PLD primary logic circuitry 106 (not shown explicitly) can communicate using a desired bus communication protocol.

Conversely, another state (e.g., a logic high state) of select signal 188 causes signal select circuitry 173 to provide a communication path or mechanism between PLD primary logic circuitry 106 and information interchange circuitry 153 via signal link 126, signal select circuitry 173, and signal link 162. Thus, by applying appropriate states of select signal 188, the user may selectively provide: (a) a communication path between PLD primary logic circuitry 106 and information interchange circuitry 153 that conforms to a desired bus communication protocol, or (b) a general communication path between PLD primary logic circuitry 106 and information interchange circuitry 153.

Note that the general communication path between PLD primary logic circuitry 106 and information interchange circuitry 153 may conform to, or implement, a communication protocol, as desired. Option (b) above, however, generally allows the user to bypass the communication path in option (a), which conforms to a desired bus communication protocol. Thus, the inventive concepts provide the user with the flexibility of selective communication using a desired bus protocol. By bypassing communication using the bus protocol, the user can overcome limitations of some bus protocols, as described above, and therefore increase communication throughput.

By using information interchange circuitry 153, bridge interface circuitry 156 can communicate any desired information (e.g., data, status, and control information) with bridge interface circuitry 159. As noted above, in exemplary embodiments, information interchange circuitry 153 may constitute one or more memory circuits or buffers, such as FIFOs.

Bridge interface circuitry 159 operates in a similar manner as bridge interface circuitry 156. Bridge interface circuitry 159 includes interface circuitry 185 and signal select circuitry 179. Interface circuitry 185 allows bridge 123 to recognize, and communicate using, a desired bus protocol. In other words, by using signal link 129 and interface circuitry 185, bridge 123 and PLD secondary logic circuitry 109 (not shown explicitly) can communicate using a desired bus communication protocol.

Through signal link 129, interface circuitry 185 may communicate data, status, and control signals (for example, signals for read and write operations) with PLD secondary logic circuitry 109. More specifically, signal link 129 and interface circuitry 185 allow PLD secondary logic circuitry 109 to communicate with bridge 123 using a desired bus communication protocol by communicating signals with prescribed or desired timing and sequence. As an example, signal link 129 and interface circuitry 185 may communicate appropriate signals for a read operation or a write operation.

Interface circuitry 185 communicates with signal select circuitry 179 via signal link 182, which provides a mechanism for communicating data, status, and control signals (for example, signals for read and write operations). Based on select signal 191, signal select circuitry 179 may selectively communicate signals between interface circuitry 185 and information interchange circuitry 153. Select signal 188 and select signal 191 may constitute the same signal, or different signal derived from another signal within the PLD, as desired.

Signal select circuitry 179 communicates with PLD secondary logic circuitry 109 via signal link 129. Through signal link 129, PLD secondary logic circuitry 109 may communicate data, control, and status signals (for example, signals for read and write operations) with signal select circuitry 179. Based on select signal 191, signal select circuitry 179 may selectively communicate signals between PLD secondary logic circuitry 109 and information interchange circuitry 153.

Similar to the role select signal 188 has, select signal 191 determines whether signal select circuitry 179 provides a way for PLD secondary logic circuitry 109 to communicate with information interchange circuitry 153 directly or through interface circuitry 185. More specifically, one state (e.g., a logic low state) of select signal 191 causes signal select circuitry 179 to provide a communication path or mechanism between PLD secondary logic circuitry 109 and information interchange circuitry 153 through signal link 129, interface circuitry 185, signal link 182, and signal link 165. In this state, by using signal link 129 and interface circuitry 185, bridge 123 and PLD secondary logic circuitry 109 (not shown explicitly) can communicate using a desired bus communication protocol.

Conversely, another state (e.g., a logic high state) of select signal 191 causes signal select circuitry 179 to provide a communication path or mechanism between PLD secondary logic circuitry 109 and information interchange circuitry 153 via signal link 129, signal select circuitry 179, and signal link 165. In other words, by applying appropriate states of select signal 191, the user may selectively provide: (a) a communication path between PLD secondary logic circuitry 109 and information interchange circuitry 153 that conforms to a desired bus communication protocol, or (b) a general communication path between PLD secondary logic circuitry 109 and information interchange circuitry 153.

As noted above with respect to bridge interface circuitry 156, the general communication path between PLD secondary logic circuitry 109 and information interchange circuitry 153 may conform to, or implement, a communication protocol, as desired. Option (b) above, however, generally allows the user to bypass the communication path in option (a), which conforms to a desired bus communication protocol. Thus, the user has the flexibility of selective communication using a desired bus protocol. By bypassing communication using the bus protocol, the user can overcome limitations of some bus protocols, as described above, and therefore increase communication throughput.

As persons of ordinary skill in the art who have the benefit of the description of the invention understand, one may use a wide variety of embodiments that fall within the scope of the inventive concepts. For example, bridge interface circuitry 156 may serve as a master interface, whereas bridge interface circuitry 159 may serve as a slave interface. Conversely, bridge interface circuitry 159 may serve as a master interface, whereas bridge interface circuitry 156 may serve as a slave interface. Furthermore, information interchange circuitry may include one or more memory circuits or buffers, such as FIFOs, as desired. Moreover, signal select circuitry 173 and signal select 179 may constitute multiplexers, as desired.

Figure 6:
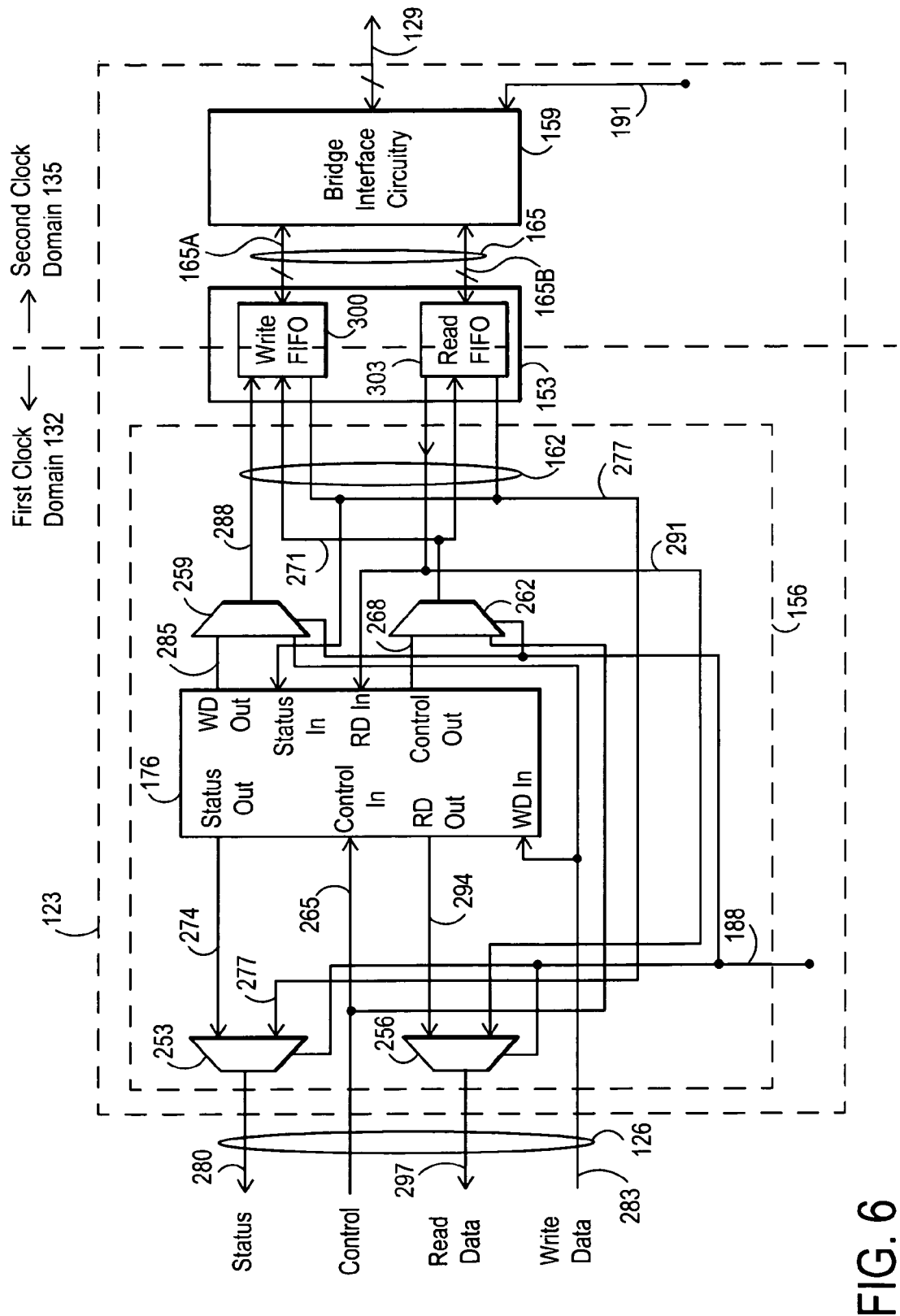
FIG. 6 depicts a more detailed conceptual block diagram of an illustrative embodiment of a bridge according to the invention.

FIG. 6 illustrates a more detailed conceptual block diagram of another exemplary embodiment of bridge 123 according to the invention. Bridge 123 includes bridge interface circuitry 156, information interchange circuitry 153, and bridge interface circuitry 159. Bridge interface circuitry includes interface circuitry 176, multiplexer (MUX) 253, MUX 256, MUX 259, and MUX 262. In the embodiment shown in FIG. 6, MUX 253, MUX 256, MUX 259, and MUX 262 constitute signal select circuitry 173 (not shown explicitly as a block in FIG. 6). One may combine MUX 253, MUX 256, MUX 259, and MUX 262 in one multiplexer circuit or block, as desired.

Bridge interface circuitry 156 includes interface circuitry 176 and MUX 253, MUX 256, MUX 259, and MUX 262. Interface circuitry 176 allows bridge 123 to recognize, and communicate using, a desired bus protocol. In other words, by using signal link 126 and interface circuitry 176, bridge 123 and PLD primary logic circuitry 106 (not shown explicitly) can communicate using a desired bus communication protocol.

Interface circuitry 176 accepts control signal(s) 265 at its "control in" input, derives output control signal(s) 268 from control signal(s) 265, and provides output control signal(s) 268 at its "control out" output. Control signal(s) 265 are configured to ultimately control the operation of information interchange circuitry 153, either directly or through interface circuitry 176. For example, control signal(s) 265 may control read and write operations of information interchange circuitry 153, as persons skilled in the art who have the benefit of the description of the invention understand.

Input control signal(s) 265 meet or conform to the communication protocol of a desired bus. Interface circuitry 176 uses input control signal(s) 265 to generate output control signal(s) 268 (which may conform to an internal protocol of information interchange circuitry 153 or a general communication protocol, as desired). MUX 262 provides control signal(s) 271 to information interchange circuitry 153. Based on the state of select signal 188, control signal(s) 271 constitute either output control signal(s) 268 of interface circuitry 176, or control signal(s) 265. Thus, the user may selectively communicate control signals to information interchange circuitry 153 that meet communication protocols of a desired bus.

Interface circuitry 176 accepts status signal(s) 277 at its "status in" input, derives output status signal(s) 274 from status signal(s) 277, and provides output status signal(s) 274 at its "status out" output. Status signal(s) 274 may indicate the status of interface circuitry 176 and/or results of operations that interface circuitry 176 performs. By way of illustration, status signal(s) 274 may indicate results or status of read or write operations, as persons skilled in the art who have the benefit of the description of the invention understand. Information interchange circuitry 153 generates status signal(s) 277. Status signal(s) 277 indicate the status of information interchange circuitry 153 and/or results of its operations. For example, status signal(s) 277 may indicate results or status of read or write operations, as persons skilled in the art who have the benefit of the description of the invention understand.

Output status signal(s) 274 meet or conform to the communication protocol of a desired bus. Interface circuitry 176 uses input status signal(s) 277 (which may conform to an internal protocol of information interchange circuitry 153 or a general communication protocol, as desired) to generate output status signal(s) 274, which conform to the communication protocol of a desired bus.

MUX 253 provides status signal(s) 280 as output signal(s) of bridge 123. Based on the state of select signal 188, status signal(s) 280 constitute either output status signal(s) 274 of interface circuitry 176, or status signal(s) 277 of information interchange circuitry 153. Thus, the user may selectively communicate status signals to information interchange circuitry 153 that meet communication protocols of a desired bus.

Interface circuitry 176 accepts write data (or "WD") signal(s) 283 at its "WD in" input, derives write data signal(s) 285 from signal(s) 283, and provides write data signal(s) 285 at its "WD out" output. Write data signal(s) 283 are configured for ultimate writing to information interchange circuitry 153, either directly or through interface circuitry 176.

Write data signal(s) 283 meet or conform to the communication protocol of a desired bus, such as protocols for write operations. Interface circuitry 176 uses write data signal(s) 283 to generate write data signal(s) 285 (which may conform to an internal protocol of information interchange circuitry 153 or a general communication protocol, as desired).

MUX 259 provides write data signal(s) 288 to information interchange circuitry 153. Based on the state of select signal 188, write data signal(s) 288 constitute either output write data signal(s) 285 of interface circuitry 176, or write data signal(s) 283. Thus, the user may selectively communicate write data signals to information interchange circuitry 153 that meet communication protocols of a desired bus.

Information interchange circuitry 153 generates read data (or "RD") signal(s) 291. Read data signal(s) 291 represent data from read operations of information interchange circuitry 153. Interface circuitry 176 accepts read data signal(s) 291 at its "RD in" input, derives read data signal(s) 294 from signal(s) 291, and provides read data signal(s) 294 at its "RD out" output. Thus, read data signal(s) 297 are read from information interchange circuitry 153, either directly or through interface circuitry 176.

Read data signal(s) 294 meet or conform to the communication protocol of a desired bus. Interface circuitry 176 generates read data signal(s) 294 such that they conform to the communication protocol of a desired bus, such as protocols for read operations. MUX 256 provides read data signal(s) 297 as output signal(s) of bridge 123. Based on the state of select signal 188, read data signal(s) 297 constitute either output read data signal(s) 294 of interface circuitry 176, or read data signal(s) 291 of information interchange circuitry 153. Thus, the user may selectively receive read data signals from information interchange circuitry 153 that meet communication protocols of a desired bus.

Information interchange circuitry 153 includes write FIFO 300 and read FIFO 303. Note, however, that information interchange circuitry 153 may have other configurations, as persons of ordinary skill in the art who have the benefit of the description of the invention understand. As an example, one may combine write FIFO 300 and read FIFO 303 into one FIFO block or circuitry as desired.

Write FIFO 300 receives write data signal(s) 288 from MUX 259. Write FIFO 303 communicates with bridge interface circuitry 159 via signal link 165A. Signal link 165A may communicate data (e.g., write data signals), status, and control signals. Read FIFO 303 communicates with bridge interface circuitry 159 via signal link 165B. Signal link 165B may communicate data (e.g., read data signals), status, and control signals. Read FIFO 303 provides read data signal(s) 291 to interface circuitry 176 and MUX 256.

Bridge interface circuitry 159 may include similar architecture and circuitry as bridge interface circuitry 156, as persons of ordinary skill in the art with the benefit of the description of the invention understand. Thus, bridge interface circuitry 159 may include multiplexers to implement a signal select circuitry (similar to signal select circuitry 173), as desired.

Furthermore, referring to FIG. 6, bridge interface circuitry 156 (and, hence, PLD primary logic circuitry 106) and bridge interface circuitry 159 (and therefore PLD secondary logic circuitry 109) may assume various roles in the PLD in which they reside. More specifically, bridge interface circuitry 156 may constitute a master interface circuitry, whereas bridge interface circuitry 159 may constitute a slave interface circuitry, as desired.

Conversely, bridge interface circuitry 156 may be a slave interface circuitry, whereas bridge interface circuitry 159 may serve as a master interface circuitry, as desired. Bridge 123 therefore provides a flexible mechanism for communication and exchange of information between PLD primary logic circuitry 106 and PLD secondary logic circuitry 109.

Figure 7:
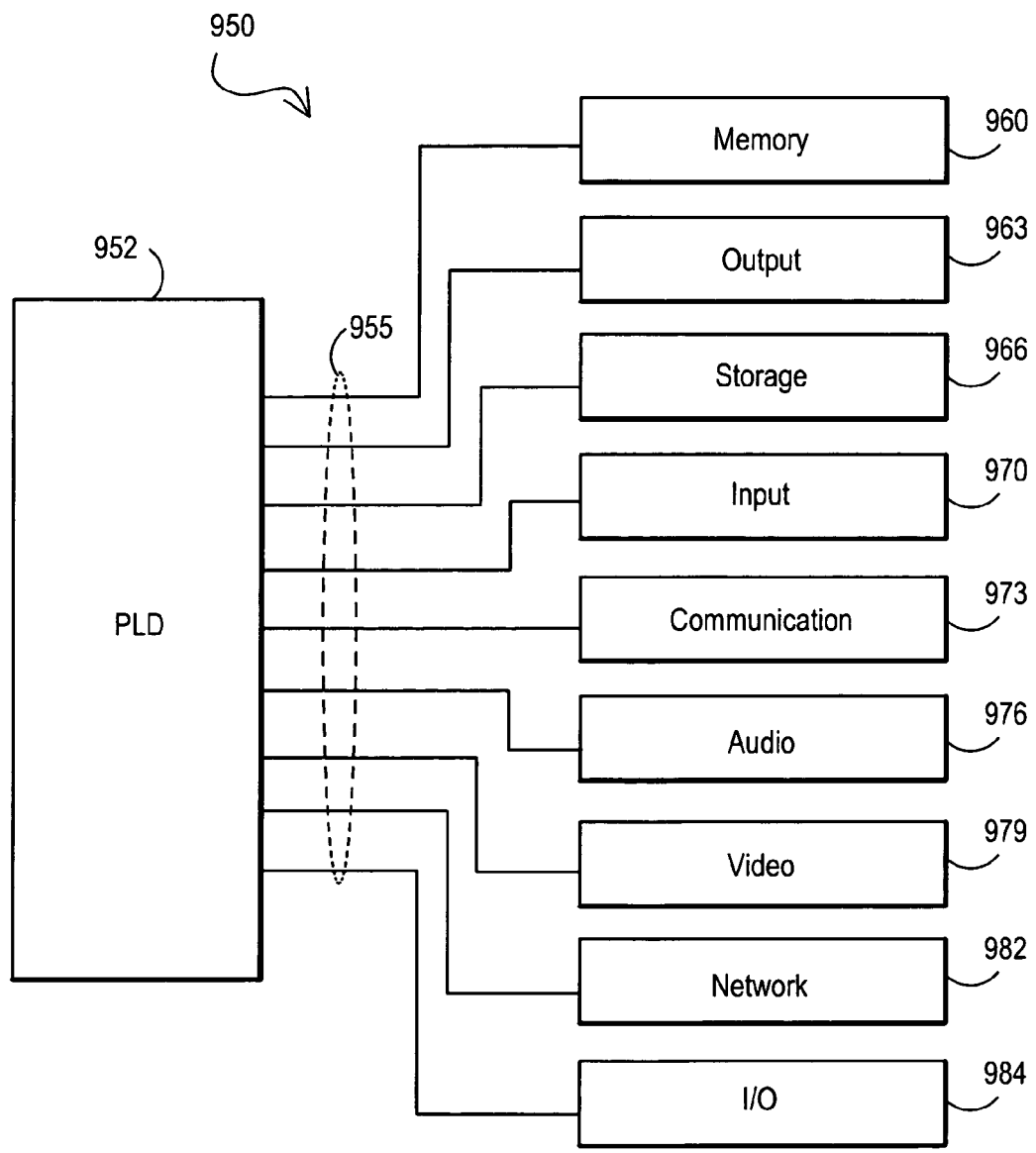
FIG. 7 shows an illustrative embodiment of a data-processing system that includes one or more PLDs according to the invention.

One may use PLDs according to the invention, such as those described above, in a variety of data-processing systems and applications. FIG. 7 shows an illustrative embodiment 950 of a data-processing system that includes PLD 952 (although one may include more than one PLD 952 in embodiment 950, as desired). PLD 952 constitutes a PLD according to the invention, and may be similar to, or the same as, PLD 103, as desired.

Embodiment 950 optionally includes a plurality of peripherals 960–984 that couple to PLD 952 via a plurality of signal links 955. Signal links 955 may constitute any suitable signal lines or a collection of a plurality of signal lines (i.e., a plurality of signal lines coupled to each of peripherals 960–984, and the collection of the plurality of signal lines constituting signal links 955). For example, signal links 955 may constitute one or more buses or other communication and coupling mechanisms, as persons of ordinary skill in the art with the benefit of the description of the invention understand. Note that embodiment 950 may exclude some of peripherals 960–984 or include a plurality of some or all of peripherals 960–984, as desired. PLD 952 may also include one or more processors (not shown explicitly), which may couple to various parts of PLD 952 and/or peripherals 960–984, as desired. The processor(s) may reside in first clock domain 132 and/or second clock domain 135, as desired. Furthermore, PLD 952 may couple to, and operate in conjunction with, one or more processors (not shown explicitly) external to PLD 952, as desired.

The illustrative embodiments of the invention described above refer to PLDs. Note, however, that one may apply the inventive concepts effectively to circuitry known by other names in the art, such as complex programmable logic device (CPLD), programmable gate array (PGA), and field programmable gate array (FPGA), as desired. Furthermore, one may apply the inventive concepts to ICs such that one side of the bridge couples to pins or output ports on the IC and circuitry external to the IC couples to the information interchange circuitry within the IC, either directly, or though a bus, as desired. The choice of circuitry depends on the design and performance specifications for a particular application and depends on factors that fall within the knowledge of persons skilled in the art with the benefit of the description of the invention.

Referring to the figures, the various blocks shown depict mainly the conceptual functions and signal flow. The actual circuit implementation may or may not contain separately identifiable hardware for the various functional blocks. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation, as persons of ordinary skill in the art who have the benefit of the description of the invention understand.

Other modifications and alternative embodiments of the invention in addition to those described here will be apparent to persons of ordinary skill in the art who have the benefit of the description of the invention. Accordingly, this description teaches those skilled in the art the manner of carrying out the invention and are to be construed as illustrative only. As persons of ordinary skill in the art with the benefit of the description of the invention understand, one may make many modifications to the circuit arrangements described here and shown in the accompanying figures, as desired, without departing from the inventive concepts.

For example, one may use fewer, more, or different signals, signal links, conductors, and the like in the interfaces, as desired. As another example, one may modify and generalize the circuitry and concepts to accommodate other sizes of the various variables, such as input sizes, output sizes, number of inputs, outputs, and signals, and the like. By modifying the circuit arrangements shown, one may use desired buses, bus interface mechanisms and circuitry, IP blocks, logic circuitry, and the like. The modifications depend on the design and performance specifications for a particular implementation and, as noted, fall within the knowledge of persons skilled in the art who have the benefit of the description of the invention.

Furthermore, persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

I claim:

1. A method of communicating information to an information interchange circuitry in a programmable logic device (PLD) that includes programmable logic circuitry and a bridge circuitry, the method comprising selectably providing a communication path between the information interchange circuitry and either the programmable logic circuitry or a first interface circuitry within the bridge circuitry; and operating the first interface circuitry and the programmable logic circuitry in a first clock domain characterized by a first clock frequency.

2. The method according to claim 1, further comprising providing a communication path between the programmable logic circuitry and the first interface circuitry according to a bus communication protocol.

3. The method according to claim 2, further comprising communicating with a first logic circuitry in the programmable logic device (PLD) via the bridge circuitry.

4. The method according to claim 3, further comprising selectably providing a communication path between the information interchange circuitry and either the first logic circuitry or a second interface circuitry within the bridge circuitry.

5. The method according to claim 4, further comprising providing a communication path between the first logic circuitry and the second interface circuitry according to the bus communication protocol.

6. The method according to claim 5, further comprising operating the second interface circuitry and the first logic circuitry in a second clock domain characterized by a second clock frequency.

7. The method according to claim 6, wherein the communication path in selectably providing a communication path between the information interchange circuitry and either the programmable logic circuitry or the first interface circuitry comprises a communication path for data, status, and control signals.

8. The method according to claim 7, wherein the communication path in selectably providing a communication path between the information interchange circuitry and either the first logic circuitry or the second interface circuitry comprises a communication path for data, status, and control signals.

9. The method according to claim 8, wherein the first logic circuitry comprises a processor, an intellectual property (IP) circuit block, or a communication interface circuit.

10. The method according to claim 9, wherein the bus communication protocol comprises a communication protocol for an AMBA high-speed bus (AHB).

11. The method according to claim 10, further comprising using the information interchange circuitry to communicate information in a first-in, first-out (FIFO) manner.

12. A method of communicating information to an information interchange circuitry in a bridge circuitry within a programmable logic device (PLD), wherein the bridge circuitry includes an interface circuitry configured to communicate information via a first set of at least one signal, the method comprising selectably coupling to the information interchange circuitry either the first set of at least one signal or a second set of at least one signal; and providing within the programmable logic device (PLD) a first logic circuitry, the first logic circuitry configured to communicate information via the second set of at least one signal.

13. The method according to claim 12, further comprising communicating information between the interface circuitry and the first logic circuitry via a third set of at least signal according to a bus communication protocol.

14. The method according to claim 13, further comprising operating the interface circuitry as a master interface circuitry.

15. The method according to claim 13, further comprising operating the interface circuitry as a slave interface circuitry.

16. The method according to claim 13, wherein the first logic circuitry comprises programmable logic circuitry within the programmable logic device (PLD).

17. The method according to claim 13, wherein the first logic circuitry comprises a processor, an intellectual property (IP) circuit block, or a communication interface circuit.

18. The method according to claim 17, further comprising operating the first logic circuitry within a first clock domain.

19. The method according to claim 18, further comprising:
 providing within the programmable logic device (PLD) programmable logic circuitry coupled to the information interchange circuitry; and
 operating the programmable logic circuitry within a second clock domain.

20. The method according to claim 13, further comprising:
 communicating at least one data signal, at least one status signal, and at least one control signal via the first set of at least one signal;
 communicating at least one data signal, at least one status signal, and at least one control signal via the second set of at least one signal; and
 communicating at least one data signal, at least one status signal, and at least one control signal via the third set of at least one signal.

21. The method according to claim 20, wherein:
 communicating at least one data signal via the first set of at least one signal further comprises communicating at least one read data signal and at least one write data signal;
 communicating at least one data signal via the second set of at least one signal further comprises communicating at least one read data signal and at least one write data signal; and
 communicating at least one data signal via the third set of at least one signal further comprises communicating at least one read data signal and at least one write data signal.

22. The method according to claim 13, wherein the bus communication protocol comprises an AMBA high-speed bus (AHB) communication protocol.

23. The method according to claim 13, wherein selectably communicating information with the information interchange circuitry further comprises communicating information in response to a state of a select signal.

24. The method according to claim 23, further comprising configuring the state of the select signal during a configuration of the programmable logic device (PLD).

25. The method according to claim 24, further comprising changing the state of the select signal after the configuration of the programmable logic device (PLD).

* * * * *